United States Patent [19]
Junta et al.

[11] Patent Number: 5,154,359
[45] Date of Patent: Oct. 13, 1992

[54] COMPARTMENTALIZED BASKET TRUCK

[76] Inventors: James A. Junta, ON735 Coventry Dr., Wheaton, Ill. 60187; John L. Atkinson, 547 Devils La., Walworth, Wis. 53184

[21] Appl. No.: 667,569

[22] Filed: Mar. 11, 1991

[51] Int. Cl.⁵ .............................................. B62B 3/10
[52] U.S. Cl. .................................... 280/79.2; 211/71; 211/126; 248/129
[58] Field of Search ................ 280/79.11, 79.2, 47.34, 280/47.35, 79.3; 248/129; 211/71, 126; 186/27

[56] References Cited

U.S. PATENT DOCUMENTS 2,625,973  1/1953  Weldon et al. .................. 280/79.2
4,687,215  8/1987  Brendgord et al. ............ 280/79.11

Primary Examiner—Andres Kashnikow
Assistant Examiner—Richard Camby
Attorney, Agent, or Firm—Kajane McManus

[57] ABSTRACT

The compartmentalized basket truck includes a wood slat base platform having a caster at least at each corner thereof. Each caster includes a steel support plate by means of which it is engaged to the base platform. Also provided is a steel framework including uprights extending upwardly from the base platform and supporting thereon a plurality of horizontal cross members to create a plurality of divisions to the basket truck. Within each division is received a compartment forming fabric body which is secured to the horizontal frame members by clips. Each of four corner uprights of the framework is engaged through the base platform and to a corresponding steel plate to relieve stress on the corners of the platform of the basket truck.

11 Claims, 4 Drawing Sheets

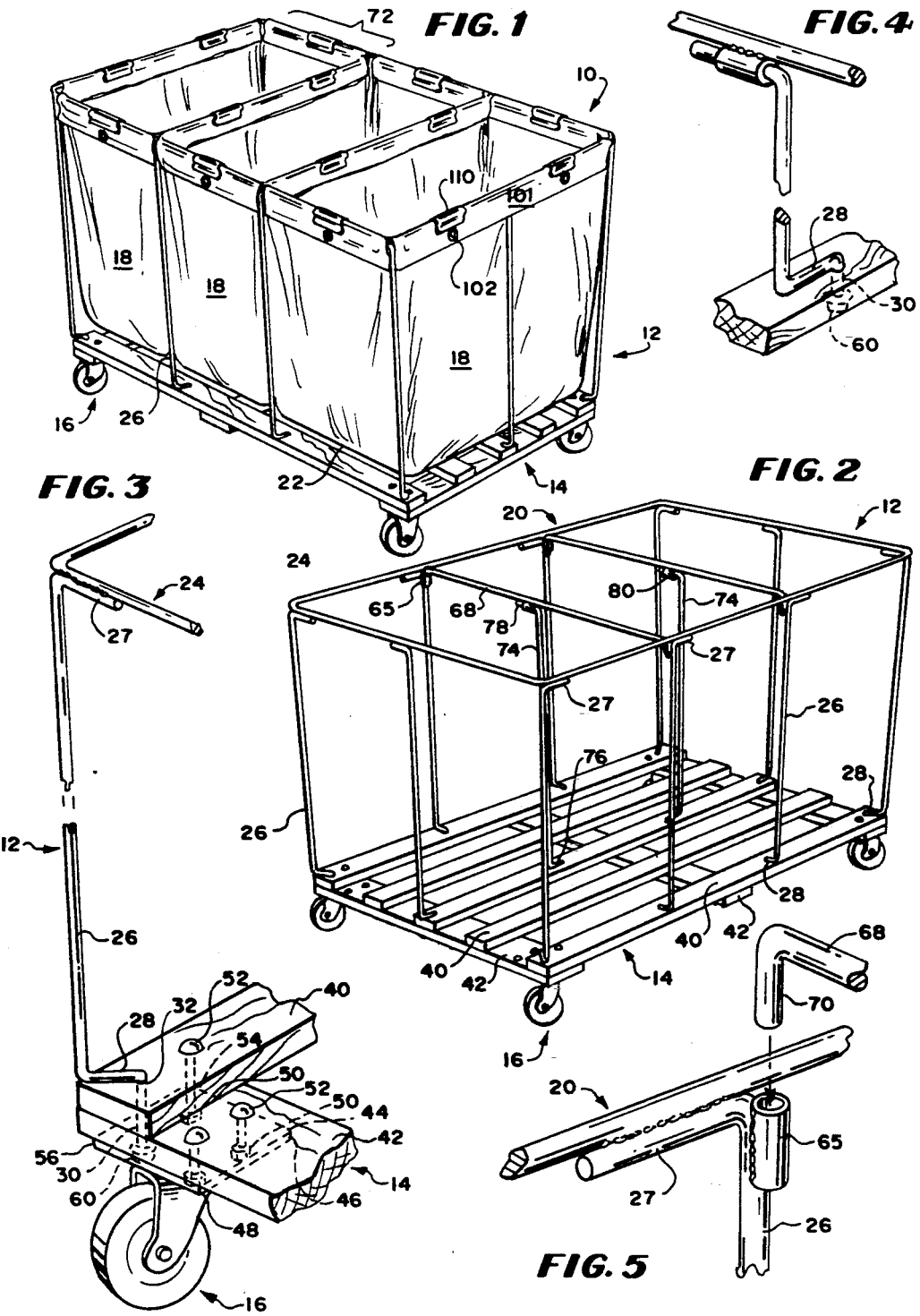

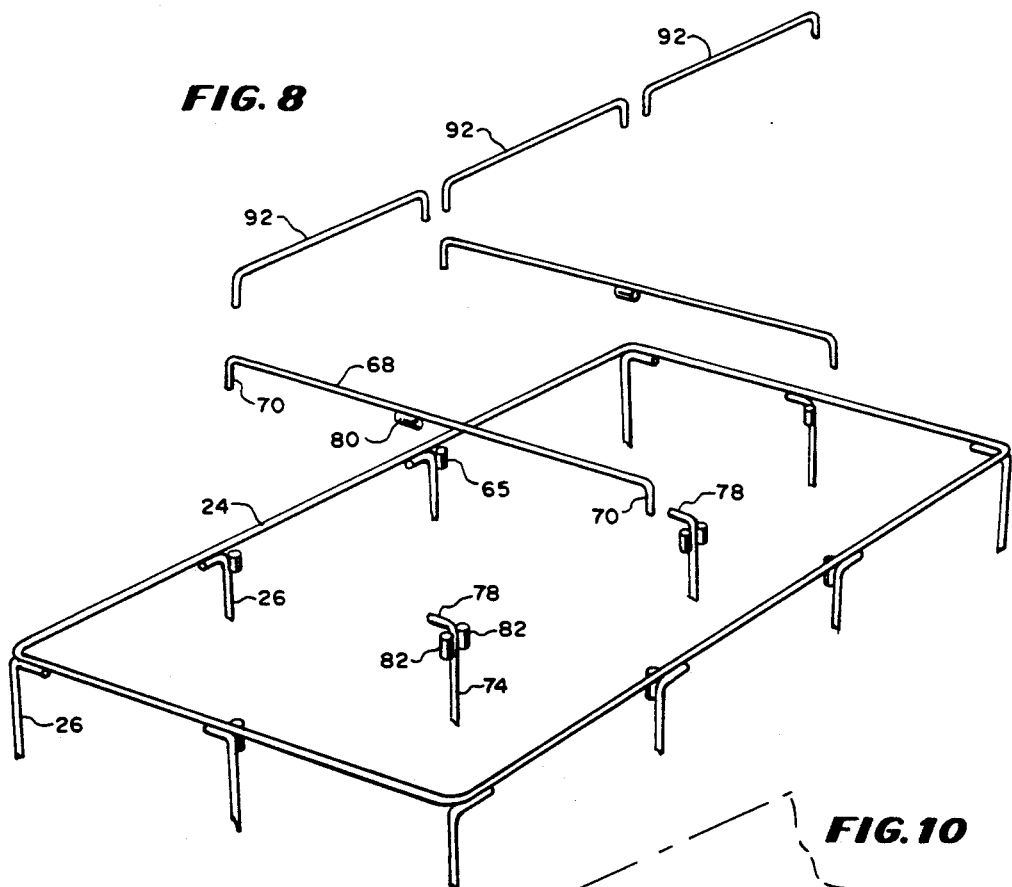
FIG. 8
FIG. 9A
FIG. 9B
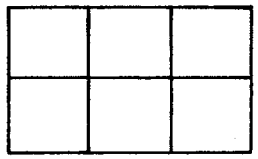
FIG. 9C
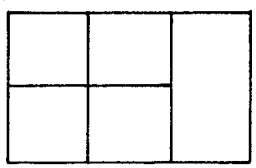
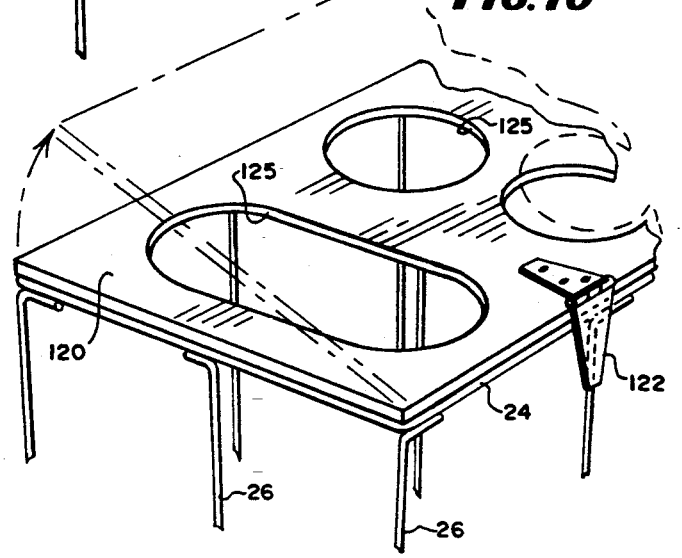
FIG. 10

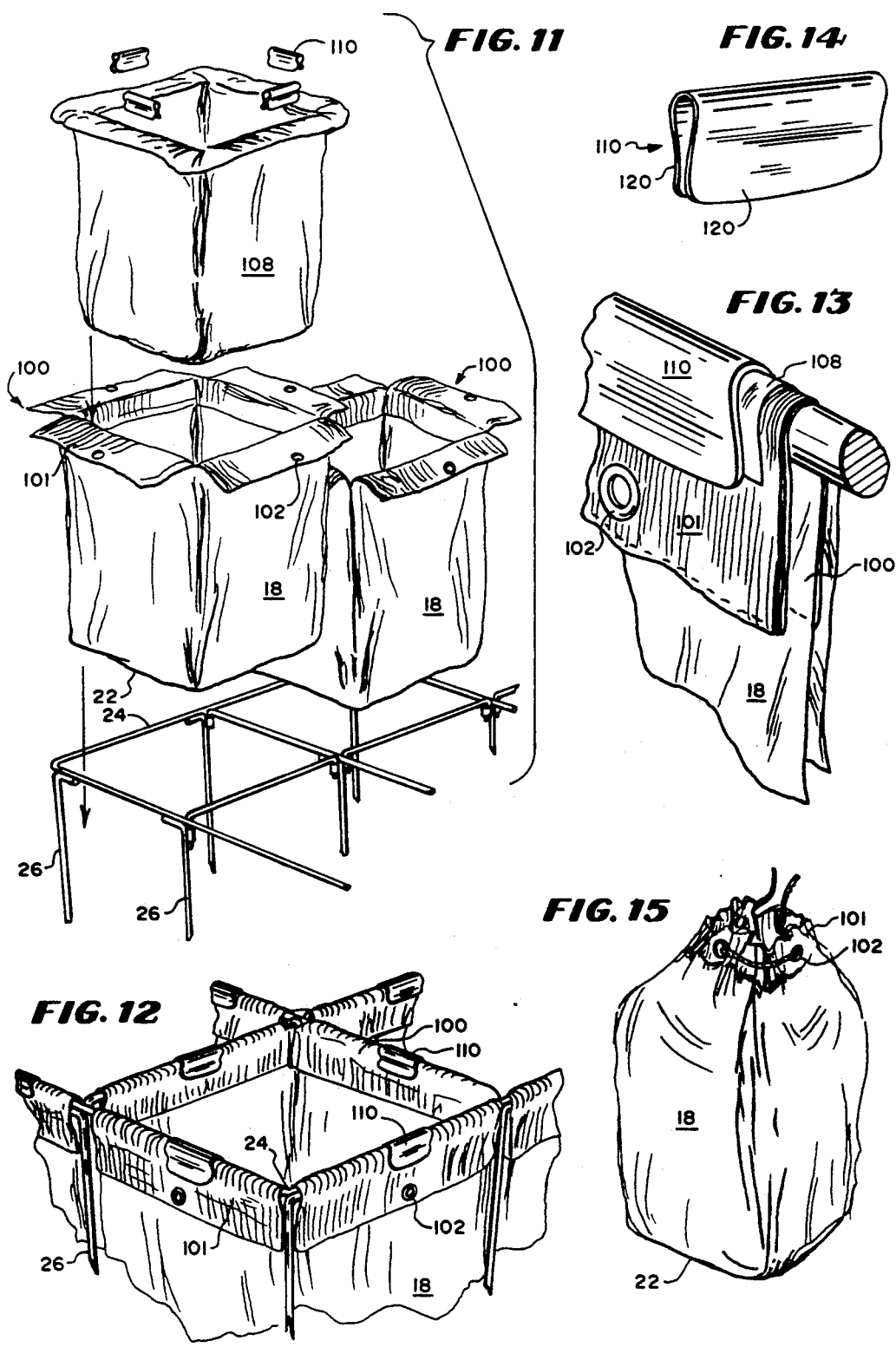

COMPARTMENTALIZED BASKET TRUCK

BACKGROUND OF THE INVENTION

The present invention relates to a compartmentalized basket truck for use, for example in isolating recycleables from one another and includes a stress relieving framework which has a significantly increased longevity and light weight.

PRIOR ART

Heretofore various embodiments of basket trucks have been proposed for use in numerous fields. Typically such basket trucks include a framework which defines a single large compartment and requires a heavy base platform which attempts to relieve stress on the corners of the basket truck.

As will be described in greater detail hereinafter, the basket truck of the present invention provides a framework which allows for the creation of various numbers of compartments, as required, within the basket truck and further provides a framework which, by its configuration, relieves the corner stress which normally causes framework failure, and allows for the provision of a light weight, cost effect base platform as well.

BRIEF DESCRIPTION OF THE DRAWINGS

FIG. 1 is a perspective view of the basket truck of the present invention shown to incorporate three compartments.

FIG. 2 is a perspective view of the framework of the basket truck of FIG. 1.

FIG. 3 is an enlarged perspective view of a corner section of the framework of FIG. 2.

FIG. 4 is an enlarged perspective view of a portion of the framework intermediate of the corner sections.

FIG. 5 is an enlarged perspective view of an area of a top rail of the framework and shows engagement of a cross member thereto.

FIG. 8 is an exploded perspective view of an upper portion of the framework of FIG. 6.

FIGS. 9A, 9B and 9C depict various examples of compartmental configurations which can be created with the framework including the cross members.

FIG. 10 is a perspective view of a portion of the top of the framework and shows an optional basket cover engaged thereto.

FIG. 11 is an exploded perspective view of a portion of the framework, and further shows fabric compartment forming bodies to be inserted into the framework, one disposable liner to be inserted into a fabric body, if desired, and clips for engaging at least the fabric bodies to the framework.

FIG. 12 is a perspective view of all the elements of FIG. 11 as they appear when engaged to one another.

FIG. 13 is a enlarged perspective view of an area of engagement of the elements of FIG. 12 with portions broken away to show the pattern of engagement.

FIG. 14 is an enlarged perspective view of the clip of FIG. 11.

FIG. 15 is a perspective view of a fabric body removed from the framework and closed for containment of the content therein.

SUMMARY OF THE INVENTION

Figure 6:
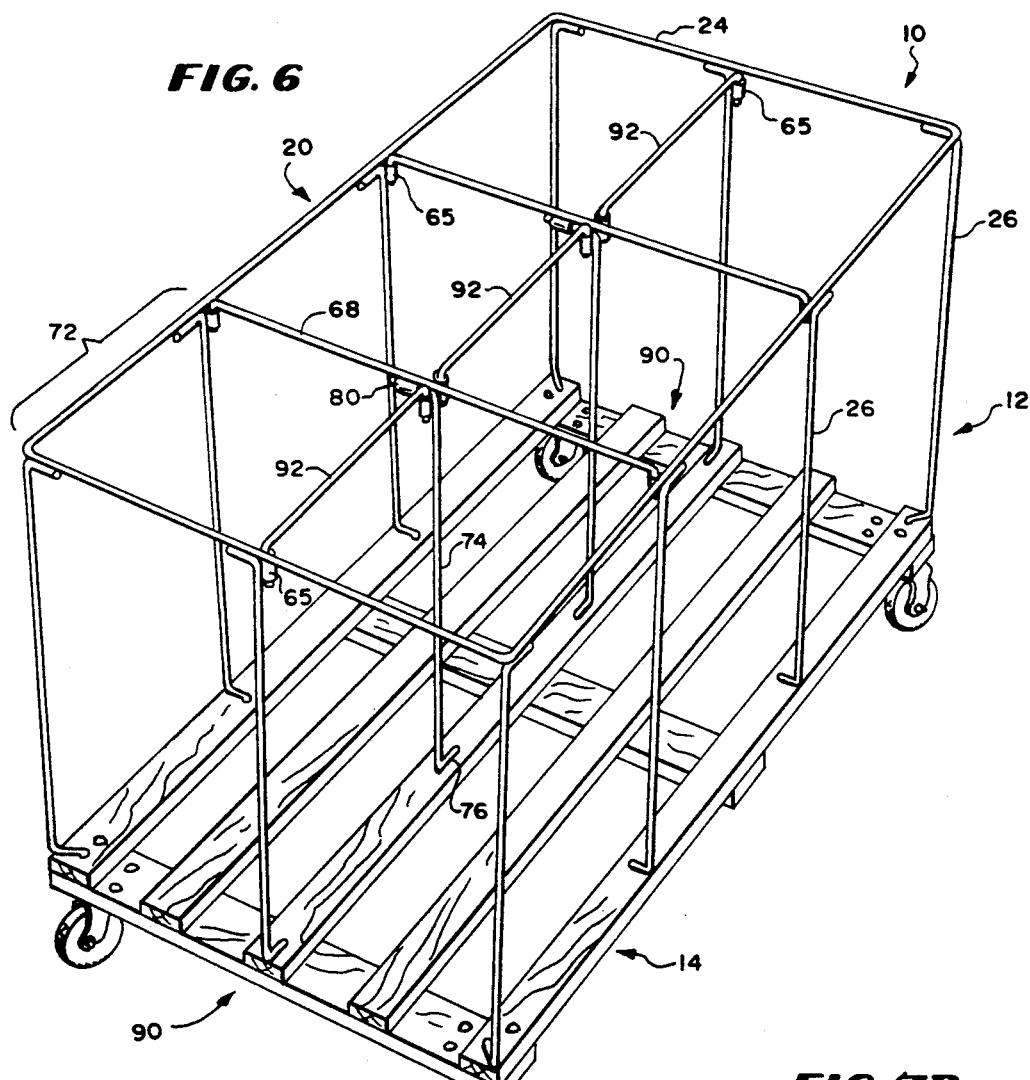
FIG. 6 is an enlarged perspective view of the framework of FIG. 2 having further cross members engaged thereto to create, six compartments.
Figure 7A:
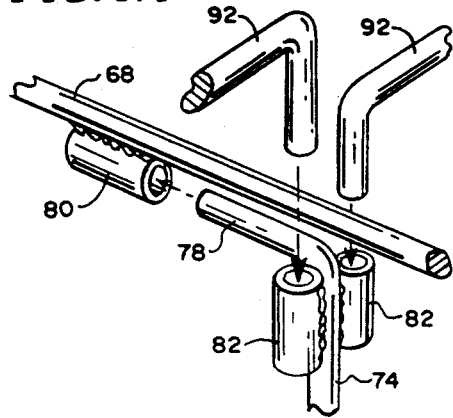
FIGS. 7a and 7b are enlarged views depicting the manner of engagement of the further cross members to the framework.
Figure 7B:
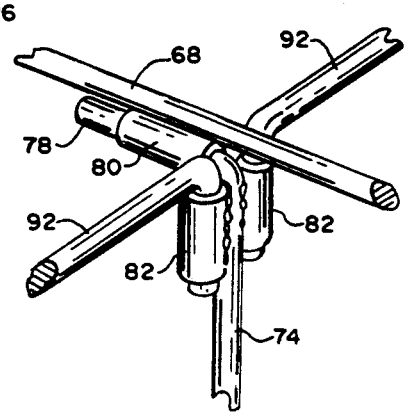

According to the invention there is provided a compartmentalized basket truck which can afford up to six compartments, as desired. The basket truck includes a framework which is configured to ease stress on the corners thereof, increasing longevity and further allowing a base platform of the basket truck to be reinforced to a lesser degree, creating a cost efficient, versatile light weight product. An optional cover may be provided to maintain the content of the compartments out of sight, for aesthetics.

DESCRIPTION OF THE PREFERRED EMBODIMENT

Referring now to the drawings in greater detail, there is illustrated in the drawings a compartmentalized basket truck 10 made in accordance with the teachings of the present invention.

As shown, the basket truck 10 includes a framework 12 supported on a base platform 14 which has a caster 16 located at least at each corner thereof.

The framework 12, as will be described in greater detail hereinafter, is adapted to support thereon a chosen plurality of compartment forming bodies 18 which engage over upper rail members 20 of the framework 12 and depend downwardly therefrom, with a bottom surface 22 of each body 18 resting on the base platform 14. Upon removal of the compartment bodies 18, the structure of the framework 12 becomes apparent.

As shown, the framework 12 includes a continuous peripheral top rim member 24 which, like the remainder of the framework 12, is made of high strength steel rod, and is elevated above the base platform 14 to a predetermined height by a plurality of peripheral upright frame members 26.

Each upright frame member 26 includes a horizontally extending upper end portion 27 which lies against a corresponding portion of the rim member 24 and is fixed thereto by welding along the length thereof.

Each upright frame member 26 further includes a horizontal base portion 28 which terminates in a downwardly depending finger 30 which passes through a corresponding opening 32 for same in the base platform 14 and is used for securing the upright member 26 to the base platform 14.

The base platform 14 is seen to comprise a plurality of longitudinal wooden slats 40 which are engaged to transverse wooden slats 42 in known manner.

Thus, at each corner of the platform are found two stacked layers of slats 40 and 42.

Beneath this area and extending laterally thereof is attached steel base plate 44 to which a caster 16 is an operatively engaged.

Two corners 46 and 48 of the base plate 44 thus lie beneath a single slat 42 and are fixed thereto by means of nuts 50 and bolts 52 or other such engagement means.

The other two corners 54 and 56 of the base plate 44 lie under the double layer of slats 40 and 42. The corner 54 of the base plate 44 is engaged to the base platform 14 by means of a nut 50 and bolt 52 as well.

The final corner 56 of the base plate 44, however is engaged to the platform 14 by the finger 30 of the corner upright 26, the free end of the finger 30 depending below the plate 44 being engaged by a lock nut 60.

This securement of the corner upright 26 to the base plate 44 is significant in relieving stress on the framework 12 of the basket truck 10, and most particularly on the corners thereof.

In this respect, most of the stress on the basket truck 10 is taken up at the corners thereof, being carried down the uprights 26 and into the structure of the base platform 14.

When the corner upright 26 is engaged merely to the wood slats 40 and 42 of the platform 14, the wood slats 40 and 42 crack around the stress point, compromising the integrity of the platform 14. Typically, upon such cracking of the slats 40 and 42, the basket truck 10 loses its shape and becomes unwieldy, significantly decreasing the useful life of the basket truck 10. In the past, this problem has been dealt with by providing a greatly reinforced base platform, increasing the weight as well as the cost of such basket truck.

In the embodiment disclosed herein, the weight of the basket truck 10 is significantly decreased, as is the cost, by simply engaging the corner uprights 26 through and to the base plate 44 supporting each caster 16.

Returning now to a study of the central structures of the framework 12 by means of which the basket truck 10 is partitioned, it will first of all be noted that the uprights 26 intermediate the corners each include on a radially inwardly directed surface thereof, a vertical sleeve 65 which is engaged thereto by welding. Across the width of the basket truck 10 and engaged within corresponding sleeves 65 directly across from one another are top cross members 68 which include a right angle section 70 at each end thereof which engage within the sleeves 65. It is proposed to provide two such cross members 68, thereby dividing the basket truck 10 lengthwise into three equal sections 72.

To support these cross members 68 and keep them from bowing downwardly along the center thereof, each cross member 68 engages a vertical support rod 74 which engages at a bottom end 76 thereof to the base platform 14 in a manner similar to the engagement of the peripheral uprights 26. At the top of each vertical support rod 74 is an angled section 78 which is turned to the horizontal and such horizontal section 78 is engaged within a horizontal sleeve 80 welded onto the cross member 68, thus maintaining horizontal alignment of the cross member 68 along the length thereof.

Each vertical support rod 74 includes at opposed radial locations thereon, at a right angle to the horizontal section 78 and just below same, two vertical sleeves 82 which are welded thereto.

These sleeves 82, in conjunction with a vertical sleeve 65 on each peripheral upright 26 along short ends 90 of the basket truck 10, act to engage therebetween further short rod-like members 92 to divide each section 72 formed between the cross members 68 in half, providing up to six divisions in the basket truck 10 in the manner described above.

Next, depending on the chosen number of compartments desired, examples of which are shown in FIGS. 9A, 9B and 9C, the appropriate sized fabric compartment forming body 18 is chosen and slid into one of the divisions as shown in FIG. 11. Each of these fabric bodies 18 includes a reinforced peripheral top lip 100 which is divided into four segments 101 to easily flap over the framework thereunder. It will be seen that each fabric body 18 includes at least one eyelet 102 in each reinforced lip segment 101, such eyelet 102 becoming useful if it desired to secure the opening of the body 18 as shown in FIG. 15.

If desired, to maintain the interior of the fabric body 18 clean and dry, a disposable liner 108 may be seated within the body 18 for keeping the content to be placed in the fabric body 18 from contacting same.

Next, to secure the fabric body 18 and disposable liner 108 to the framework 12 in a manner to maintain the structures engaged to the framework 12, small clips 110 are provided which may be secured over the various layers to keep same from coming undone as the fabric bodies 18 are filled.

It will be understood from a study of FIGS. 12 and 13 that at times, more than one fabric body 18 is to be secured to the same framework member 68, 92 and the manner of layering of the various structures over such framework members 68 and 92 is best shown in FIG. 13.

FIG. 14 is an enlarged view of the clip 110 and shows same to be of an inverted U shape. The clip 110 is made of a stiff but flexible material, having two prongs 120, each of which can be pulled away from the other for easing engagement of the clip 110 over the layers of material and which will return to their unstressed positions to maintain the layers engaged over such framework members 68 and 92.

It has been found through empirical testing that it is sufficient to use one clip 110 per side where the fabric body 18 is square in cross section. Also, such body 18 can effectively be closed off by providing only one eyelet 102 per side.

In an embodiment where the opening in the fabric body 18 is rectangular, it has been found that two clips 110 are preferred for engagement along a longer side of the rectangle and that it is also preferred to provide two eyelets 102 along such longer side for effective closing of the opening of the body 18.

Finally, for aesthetic purposes, an optional cover 120 for the basket truck 10 may be provided for aesthetic purposes as shown in FIG. 10.

The cover 120 is made available because the basket truck 10 is proposed, as an example, for use in containing recyclables in an environment such as an office. The cover 120 would be secured by hinges 122 to one edge of the framework 12 and would include rounded edge openings 125 therein, leading into the respective compartments therebeneath. These openings 125, if desired, could be covered by lift up or push down flaps to keep the recyclables completely out of sight.

As described above the compartmentalized basket truck 10 of the present invention has a number of advantages, some of which have been described above and others of which are inherent in the invention.

Also, modifications can be proposed to the basket truck 10 without departing from the teachings herein.

Accordingly the scope of the invention is only to be limited as necessitated by the accompanying claims.

I claim:

1. A compartmentalized basket truck including a base platform comprising a layer of longitudinal wood slats and a layer of transverse wood slats fixed together in known manner, said base platform having a caster at least at each corner thereof, each said caster being mounted to said base platform by a steel support plate; a primary framework extending upwardly from said platform and including a continuous top rim elevated above said platform by a plurality of vertical peripheral upright members, said upright members including four corner members engaged through said platform and to a corresponding steel support plate, said framework further including removable horizontal cross members engageable to said primary framework to divide the basket truck into at least three sections and central uprights for maintaining the cross members horizontal at the midpoint thereof, said basket truck further including fabric bodies sized and configured to seat within the divisions of the framework and have a bottom surface which rests upon the platform, each fabric body having a reinforced top lip, said top lip being segmented and including at least one eyelet therein and being folded over a corresponding horizontal frame member and fixed thereto by a plurality of clips, said basket truck further including disposable liners seated within said fabric bodies.

2. The basket truck of claim 1 wherein each corner upright includes a free lower end which engages through said wood slats and steel plate there beneath and is secured by a lock nut in this position.

3. The basket truck of claim 2 wherein said uprights are permanently secured to said peripheral rim.

4. The basket truck of claim 3 wherein each upright intermediate the corners includes at least one vertical sleeve welded thereto for engagement of a vertical end of a cross member therein.

5. The basket truck of claim 4 wherein each cross member includes a horizontal sleeve welded thereto to which an intermediate upright support engages at an upper end thereof.

6. The basket truck of claim 5 wherein said intermediate upright supports each include two vertical sleeves thereon to which further cross members may be engaged.

7. The basket truck of claim 1 wherein said framework and cross members are made of steel.

8. The basket truck of claim 7 including a cover.

9. The basket truck of claim 8 wherein said cover includes a plurality of openings therein equal to the number of compartments formed.

10. The basket truck of claim 9 including at least three compartments.

11. The basket truck of claim 10 including no more than six compartments.

* * * * *